No. 860,090. PATENTED JULY 16, 1907.
A. P. HEIDT.
COMBINED SNAP HOOK AND CHAIN LINK.
APPLICATION FILED SEPT. 20, 1906.

Witnesses
Helge H. Murra
C. H. Griestauer

Inventor
Allen P. Heidt
by H. B. Willson & Co
Attorneys

UNITED STATES PATENT OFFICE.

ALLEN PAUL HEIDT, OF BAY SHORE, NEW YORK.

COMBINED SNAP-HOOK AND CHAIN-LINK.

No. 860,090.  Specification of Letters Patent.  Patented July 16, 1907.

Application filed September 20, 1906. Serial No. 335,497.

*To all whom it may concern:*

Be it known that I, ALLEN PAUL HEIDT, a citizen of the United States, residing at Bay Shore, in the county of Suffolk and State of New York, have invented certain new and useful Improvements in a Combined Snap-Hook and Chain-Link; and I do declare the following to be a full, clear, and exact description of the invention, such as will enable others skilled in the art to which it appertains to make and use the same.

This invention relates to improvements in snap hooks.

The object of the invention is to provide a snap hook constructed in such a manner as to form links adapted to be coupled together into a chain.

A further object is to construct a snap hook formed of a single piece of spring wire, the overlapping hooked ends of which are so arranged that they will be held together by the tension of the coil spring arranged transversely thereto at one end of said hook, said spring also forming an eye to receive a swivel or for the direct connection of the hooks with each other to form the links of a chain.

With the above and other objects in view, the invention consists of certain novel features of construction, combination and arrangement of parts, as will be hereinafter described and claimed.

Figure 1:
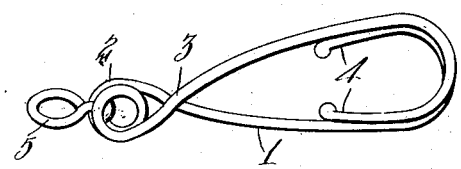
Figure 2:
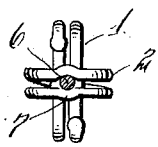
Figure 3:

In the accompanying drawings:—Figure 1 is a perspective view of a snap hook constructed in accordance with the invention; Fig. 2 is a sectional view through the swivel connection of the hook, showing the latter in end elevation; Fig. 3 is a side view of one of the hooks, showing the construction of the same when used as a chain link; and Fig. 4 is a side view of a section of chain formed by the hooks.

Referring more particularly to the drawings, 1 denotes the hook, which is constructed from a single piece of spring wire bent midway between its ends to form a coil spring 2, after which the ends are crossed and twisted transversely to the spring, as shown at 3. The ends of the wire are then bent inwardly to form overlapping hooks 4, which are held in tight engagement with each other by the action of the transversely-disposed coil spring at the opposite end of the hook. By forming the hook with the spring 2 and the overlapping hooks arranged transversely or in a plane at right angles to the spring, the spiral tension of the spring is exerted to hold the overlapping hooks into engagement, thereby greatly increasing the strength or durability of the hook.

In Figs. 1 and 2 of the drawings, the hook is shown as provided with a swiveled eye 5, the headed shank of which is engaged with the spring 2 of the hook between the coils thereof. Said coils are bent outwardly at oppositely disposed points as shown at 7, to form a hole or passage to receive the shank 6 of the eye and in which the latter may loosely turn. The eye 5 is held in place by the head formed on the inner end of the shank, as shown.

Figure 4:
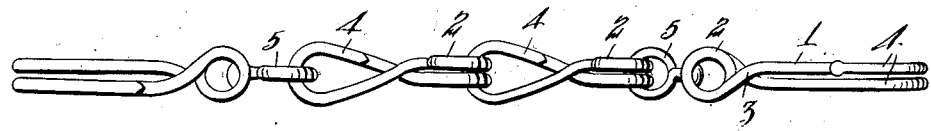

In the form of hook shown in Figs. 3 and 4, the same is constructed for use as a chain link. When used in this manner in some of the hooks the swivel eye 5 is dispensed with and the eye formed by the coil spring 2 is used for direct connection with the lapped hooks 4 or the eye 5 of the next adjacent link, as the case may be, or with any object to which this form of hook may be attached.

From the foregoing description, taken in connection with the accompanying drawings, the construction and operation of the invention will be readily understood without requiring a more extended explanation.

Various changes within the scope of the claims may be made in the form, proportion and the minor details of construction without departing from the principle or sacrificing any of the advantages of this invention.

Having thus described my invention, what I claim as new and desire to secure by Letters-Patent, is:—

1. A snap hook formed of a single piece of spring wire bent midway its ends to form a spring, overlapping hooks formed by bending the ends of the wire inwardly, said hooks being crossed and twisted to a plane transversely or at right angles to the plane of the spring, and a swivel connected to the spring of the hook, substantially as described.

2. A snap hook formed of a single piece of spring wire bent midway its ends to form a spring, overlapping hooks formed by bending the ends of the wire inwardly, said hooks being crossed and twisted to a plane transversely or at right angles to the plane of the spring, and a swivel eye having a shank adapted to be loosely mounted in an opening formed between the coils of said spring, substantially as described.

In testimony whereof I have hereunto set my hand in presence of two subscribing witnesses.

ALLEN PAUL HEIDT.

Witnesses:
  WILLIAM W. HULSE,
  MABEL H. HULSE.